US008637588B2

(12) United States Patent
Tanaka et al.

(10) Patent No.: US 8,637,588 B2
(45) Date of Patent: Jan. 28, 2014

(54) OPTICAL COMPOSITE MATERIAL AND OPTICAL ELEMENT

(75) Inventors: Yasuhiro Tanaka, Tokyo (JP); Katsumoto Hosokawa, Tokyo (JP); Kazutaka Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1061 days.

(21) Appl. No.: 11/997,377

(22) PCT Filed: Oct. 3, 2006

(86) PCT No.: PCT/JP2006/320153
§ 371 (c)(1),
(2), (4) Date: Jan. 30, 2008

(87) PCT Pub. No.: WO2007/043492
PCT Pub. Date: Apr. 19, 2007

(65) Prior Publication Data
US 2009/0264552 A1    Oct. 22, 2009

(30) Foreign Application Priority Data

Oct. 3, 2005   (JP) .................................. 2005-290072
Oct. 3, 2005   (JP) .................................. 2005-290073
Sep. 21, 2006  (JP) .................................. 2006-255442

(51) Int. Cl.
| G02B 1/04 | (2006.01) |
| B32B 27/00 | (2006.01) |
| B32B 27/04 | (2006.01) |
| B32B 27/14 | (2006.01) |
| C08K 7/00 | (2006.01) |
| C08K 9/08 | (2006.01) |

(52) U.S. Cl.
USPC .......... 523/107; 523/200; 523/220; 427/221; 977/779; 428/402; 428/403; 428/407; 106/816

(58) Field of Classification Search
USPC .................. 523/103, 107, 200, 220; 427/221; 977/779; 428/402, 403, 407; 106/816
See application file for complete search history.

(56) References Cited

U.S. PATENT DOCUMENTS

| 6,599,631 B2 * | 7/2003 | Kambe et al. ................. 428/447 |
| 2004/0180193 A1 | 9/2004 | Oda et al. ..................... 428/328 |

(Continued)

FOREIGN PATENT DOCUMENTS

| JP | 2002-129156 | 5/2002 |
| JP | 2003-73558 | 3/2003 |

(Continued)

OTHER PUBLICATIONS

International Search Report, Written Opinion, and International Preliminary Report on Patentability in PCT/JP2006/320153.

*Primary Examiner* — Michael Pepitone
(74) *Attorney, Agent, or Firm* — Fitzpatrick, Cella, Harper & Scinto

(57) ABSTRACT

An optical synthetic resin composed of: a synthetic resin; and fine particles dispersed in the synthetic resin at a ratio of 0.1 vol % or more to 50 vol % or less, each having a maximum length of 1 nm or more to 30 nm or less, in which part of surfaces of the fine particles are modified with functional groups which themselves repel each other, and a distance between two arbitrary adjacent fine particles among the fine particles is in a range of 0.1 nm or more to 500 nm or less. The two arbitrary adjacent fine particles attract each other with an intermolecular force, thereby making it possible to provide an optical composite deviating from an additivity range.

3 Claims, 3 Drawing Sheets

(56) References Cited

U.S. PATENT DOCUMENTS

| | | | |
|---|---|---|---|
| 2005/0007872 A1 | 1/2005 | Nagasawa et al. | 366/178.2 |
| 2005/0059766 A1* | 3/2005 | Jones et al. | 524/431 |
| 2005/0151119 A1* | 7/2005 | Jones et al. | 252/299.1 |
| 2005/0200278 A1* | 9/2005 | Jones et al. | 313/582 |
| 2006/0083694 A1* | 4/2006 | Kodas et al. | 424/46 |
| 2006/0147729 A1* | 7/2006 | Mizuno | 428/447 |
| 2007/0154709 A1* | 7/2007 | Koch et al. | 428/379 |
| 2008/0214698 A1* | 9/2008 | Baran, Jr. et al. | 523/206 |

FOREIGN PATENT DOCUMENTS

| | | |
|---|---|---|
| JP | 2003-183414 | 7/2003 |
| JP | 2003-213067 | 7/2003 |
| JP | 2004-83669 | 3/2004 |
| JP | 2004-269773 | 9/2004 |
| JP | 2004-352812 | 12/2004 |
| JP | 2005-46650 | 2/2005 |
| JP | 2005-131917 | 5/2005 |
| JP | 2005-162902 | 6/2005 |
| JP | 2006-160991 | 6/2006 |

* cited by examiner ical Field

The present invention relates to an optical composite material to be used for an optical element such as a refractive optical element, a diffractive optical element, a lens, a prism, or a filter.

BACKGROUND ART

A refractive optical element or a diffractive optical element has been used for an optical system to be mounted on, for example, a camera or a liquid crystal projector in recent years. The use of multiple refractive optical elements or multiple diffractive optical elements different from each other in refractive index, wavelength dispersibility, and secondary dispersibility enables each of optical systems that reduce chromatic aberration to be realized by using a small number of optical elements. A glass material (i.e., inorganic material) has been conventionally used in an optical element of which each of those optical systems is formed. However, an optical element composed of a glass material has a heavy weight, and is apt to splinter. Accordingly, investigation into an optical element composed of a synthetic resin material (e.g., plastic material) which has a light weight and which is available at a low cost is in progress.

A synthetic resin has a hardness lower than that of glass. Accordingly, the resin has excellent processability and a high degree of freedom in its shape. Glass is processed by pulverization, grinding, or compression molding at high temperature. In contrast, the synthetic resin is easily processed by injection molding or cast molding in a short time period. Accordingly, a cost for the processing of the synthetic resin is much lower than a cost for the processing of glass.

However, a much larger number of restrictions are imposed on the optical properties of a synthetic resin for an optical element which has been currently put into practical use such as a refractive index, wavelength dispersibility, and secondary dispersibility than on the optical properties of glass. Accordingly, optical design similar to that of an optical system composed of a glass material is not established, so it is impossible to reduce the number of optical elements, or it is difficult to correct required chromatic aberration.

In addition, an optical element composed of a synthetic resin material is superior to an optical element composed of a glass material in processability, but is apt to be flawed. Accordingly, the number of fine flaws on the surface of the optical element increases with the passage of time, so the light transmittance of the optical element reduces over time.

In addition, the elastic modulus, coefficient of water absorption, coefficient of thermal expansion, and temperature dependence of the refractive index of a synthetic resin are extremely large as compared to those of glass. For example, the coefficient of water absorption of polymethyl methacrylate (PMMA) is about 2.0%, which is an extremely large value. Accordingly, the volume of PMMA largely fluctuates in accordance with a temperature change, so a focal length changes. Accordingly, it has been difficult to use a synthetic resin in applications where high optical stability is required.

The inferiority of an optical element composed of a synthetic resin material to an optical element composed of a glass material is summarized as follows:
(1) the range of each of optical properties such as a refractive index, wavelength dispersibility, and secondary dispersibility is narrow;
(2) the former optical element has a low elastic modulus and a low surface hardness, so its surface is apt to be flawed;
(3) the former optical element has a high coefficient of thermal expansion (about $10^{-4}/°C.$), so its shape largely changes owing to heat, and it is poor in optical stability;
(4) the temperature dependence of the refractive index of the former optical element is large, so the former optical element is poor in optical stability; and
(5) the former optical element has a high coefficient of water absorption, so it is poor in optical stability.

In view of the foregoing, proposals have been made to solve the above-mentioned problems and to expand the range in which an optical element formed of a synthetic resin material can be used. That is, there has been proposed a composite material obtained by mixing a synthetic resin with an inorganic material, the composite material having a higher elastic modulus, a lower coefficient of water absorption, a lower coefficient of thermal expansion, and a smaller temperature dependence of a refractive index than those of a conventional synthetic resin. There has been also proposed an optical composite having good wavelength dispersibility of a refractive index, good secondary dispersibility, and a good light-scattering rate.

Japanese Patent Application Laid-Open No. 2005-162902 discloses an optical composite material which is made highly elastic by: adding metal oxide fine particles of silica, alumina, or the like to a cyclic olefin-based graft copolymer; and crosslinking the resultant.

Japanese Patent Application Laid-Open No. 2003-213067 discloses an optical composite material whose coefficient of thermal expansion is reduced to $8\times10^{-5}/°C.$ or less by dispersing silica fine particles in an acrylic resin.

Japanese Patent Application Laid-Open No. 2004-83669 discloses an optical composite whose coefficient of water absorption is reduced by: hydrolyzing a metal aliphatic acrylalkoxide to form an acrylate in which an extremely minute granular metal oxide is dispersed; and polymerizing the acrylate.

Japanese Patent Application Laid-Open No. 2003-73558 discloses an optical composite material obtained by dispersing ultra-fine particles each composed of a metal oxide in a polymer (PMMA). The document discloses that, in this case, the ultra-fine particles and the polymer form a nanocomposite, so it is possible to realize the mechanical, thermal, and optical effects of the polymer such as an elastic modulus, a heat forming temperature, gas barrier property, a glass transition point, and a crystallization temperature which can have not been conventionally realized. It should be noted that the term "nanocomposite" generally refers to a composite material obtained by imparting a function that cannot be exerted by any particle but a particle having a nano-size such as a quantum confining effect to a composite composition with a polymer.

Japanese Patent Application Laid-Open No. 2004-269773 discloses a method of forming a nanocomposite involving uniformly dispersing a metal oxide having polar groups (mainly a hydroxyl group) on its surface in a thermoplastic resin (PMMA). The document discloses that a composite having such a high surface hardness that the composite can resist abrasion with a wiper or the like is produced by the method.

The optical composite material described in Japanese Patent Application Laid-Open No. 2005-162902 described above is produced by adding the fine particles of a metal oxide such as silica having an average particle size of 50 nm or less to a cyclic olefin-based graft copolymer having a polysiloxane structure in any one of its side chains. In this case, however, the fine particles of the metal oxide necessarily aggregate owing to micro phase separation peculiar to a sol-gel reaction. Therefore, the optical composite material is applied to an optical element in a state where a domain is enlarged, so light scattering occurs, and it is difficult to obtain desired optical performance.

In addition, in Japanese Patent Application Laid-Open No. 2003-213067, an optical composite material having a low coefficient of thermal expansion is obtained by directly mixing an acrylic resin with 30 to 90 wt % of colloidal silica fine particles having an average particle size of 10 to 20 nm. However, when the addition amount of the silica fine particles each serving as an inorganic component is 30 wt % or more, the silica fine particles necessarily aggregate. As a result, light scattering occurs and a transmittance reduces, so it is difficult to obtain desired optical performance.

In addition, the optical composite material described in Japanese Patent Application Laid-Open No. 2004-83669 obtains the inorganic polymer of a metal alkoxide in the presence of an acrylate monomer in which minute granules are dispersed. However, when the acrylate monomer is polymerized to increase a molecular weight, compatibility between an inorganic polymer component and an organic resin component is bad, so a micro phase-separated structure is produced. As a result, the minute granules aggregate. When the optical composite material is applied to an optical element in a state where the domain of the micro phase-separated structure is enlarged, light scattering occurs, and a transmittance reduces.

In addition, Japanese Patent Application Laid-Open No. 2003-73558 describes that mechanical physical properties are improved by a nanocomposite effect. However, investigation has revealed that the optical composite material disclosed in the specification has improved mechanical physical properties, but does not deviate from a value range that can be predicted on the basis of a rule of mixtures. The term "value range that can be predicted on the basis of a rule of mixtures" refers to a value range obtained by summing the volume fractions of the physical properties of the metal oxide ultra-fine particles and the polymer (PMMA), and is called an additivity range. That is, the mere modification of the surface of each of the metal oxide ultra-fine particles with an acidic group does not allow deviation from the additivity range, though the modification improves the dispersibility of the metal oxide ultra-fine particles in the polymer.

In addition, Japanese Patent Application Laid-Open No. 2004-269773 describes that the mechanical physical properties of an optical composite material such as a bending strength, a bending modulus, and a coefficient of linear expansion are improved by a nanocomposite effect. However, this case does not allow deviation from an additivity range any more than Japanese Patent Application Laid-Open No. 2003-73558 described above. That is, the mere provision of the surfaces of metal oxide ultra-fine particles with polar groups (mainly a hydroxyl group) does not allow deviation from the additivity range, though the provision improves the dispersibility of the metal oxide ultra-fine particles in a polymer. A nanocomposite effect taking an additivity range into consideration will be described in detail in the section titled <Nanocomposite effect> in BEST MODES FOR CARRYING OUT THE INVENTION described below.

DISCLOSURE OF THE INVENTION

The present invention has been made in light of the foregoing problems, and it is an object of the present invention to provide an optical composite deviating from an additivity range in terms of the mechanical properties of an optical material such as an elastic modulus, a coefficient of water absorption, and a coefficient of thermal expansion. It is another object of the present invention to provide an optical composite having good optical properties such as the temperature dependence of a refractive index, the wavelength dispersibility of the refractive index, secondary dispersibility, and a light-scattering rate on condition that the composite deviates from the additivity range.

According to the present invention, to achieve the above-mentioned object, there is provided an optical composite material, including: a synthetic resin; and fine particles dispersed in the synthetic resin at a ratio of 0.1 vol % or more to 50 vol % or less and each having a maximum length of 1 nm or more to 30 nm or less, and in the optical composite material, parts of surfaces of the fine particles are modified with functional groups which themselves bond each other, and a distance between two arbitrary adjacent fine particles among the fine particles is 0.1 nm or more to 500 nm or less.

In addition, there is provided the optical composite material, in which the two arbitrary adjacent fine particles attract each other with an intermolecular force, and the optical synthetic resin has an elastic modulus twice or more as high as an elastic modulus of the synthetic resin.

In addition, there is provided the optical composite material, in which the optical synthetic resin has a coefficient of thermal expansion half of or less than a coefficient of thermal expansion of the synthetic resin.

The above and other objects of the Invention will become more apparent from the following drawings taken in conjunction with the accompanying drawings.

BEST MODES FOR CARRYING OUT THE INVENTION

A nanocomposite effect in the present invention will be described.
<Nanocomposite Effect>
First, a nanocomposite effect in each of Japanese Patent Application Laid-Open No. 2003-73558 and Japanese Patent Application Laid-Open No. 2004-269773 described above will be described. The nanocomposite effect in Japanese Patent Application Laid-Open No. 2003-73558 is realized by modifying the surface of each of the metal oxide ultra-fine particles with an acidic group. The nanocomposite effect in Japanese Patent Application Laid-Open No. 2004-269773 is realized by providing the surfaces of the metal oxide ultra-fine particles with polar groups (mainly a hydroxyl group).

Figure 4:
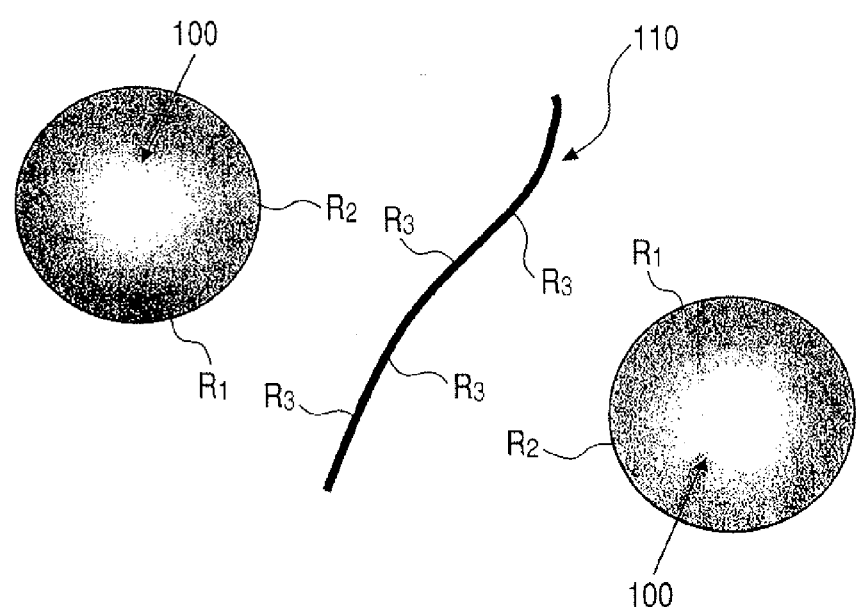
FIG. 4 is a schematic view showing a state of a conventional optical composite material.

In each of those effects, a binding force with a synthetic resin is controlled by modifying the surface of each of fine particles, whereby the aggregation of the fine particles is suppressed and a mechanical strength is improved. FIG. 4 is a schematic view showing a binding state between a fine particle and a synthetic resin in the composite optical material in Japanese Patent Application Laid-Open No. 2004-269773. In FIG. 4, reference numeral 100 represents a fine particle and reference numeral 110 represents a synthetic resin. The surfaces of the fine particles 100 are modified and coated with hydrophobic groups ($R_1$) and polar groups ($R_2$). The synthetic resin 110 has functional groups ($R_3$).

In FIG. 4, the hydrophobic groups ($R_1$) of the fine particles 100 and the functional groups ($R_3$) of the synthetic resin 110 repel each other. As a result, the aggregation of the fine particles 100 is suppressed. In addition, the polar groups ($R_2$) of the fine particles 100 and the functional groups ($R_3$) of the synthetic resin 110 try to be bonded to each other, so the flow of the fine particles 100 is suppressed and the mechanical strength of the composite optical material is improved.

To be specific, the functional groups ($R_3$) of a methacrylic acid Me acrylic acid as a monomer for polymerization and the hydrophobic groups ($R_1$) on the surfaces of the fine particles repel each other so that the aggregation of the fine particles is prevented. At the same time, the functional groups ($R_3$) of the methacrylic acid Me acrylic acid and the polar groups ($R_2$) such as an amino group and an ether group on the surfaces of the fine particles form chemical bonds such as a hydrogen bond, an ionic bond, and a covalent bond so that the mechanical strength of the composite optical material is improved. That is, a balance between a binding force between the synthetic resin 110 and each of the fine particles 100 and a repulsive force between the resin and each of the fine particles is kept at a predetermined state so that the flow of the fine particles 100 is suppressed and the nanocomposite effect is realized.

Specific investigation into the nanocomposite effect described in Japanese Patent Application Laid-Open No. 2004-269773 will be made with reference to Table 1, Table 2, and Table 3 as experimental results by taking a bending modulus as an example. The methacrylic acid Me acrylic acid serving as a monomer for polymerization has a bending modulus of 3.1 GPa (a specific gravity of 1.1) while silica as fine particles has a bending modulus of 30 GPa (a specific gravity of 2.2). In this case, physical property expected in an additivity range is represented by the sum of volume fractions. When the addition amount of silica is 30 wt %, the sum of volume fractions is calculated as shown below.

$$\frac{2.0 \times \frac{70}{1.1}}{\frac{70}{1.1} + \frac{30}{2.2}} + \frac{30 \times \frac{30}{2.2}}{\frac{70}{1.1} + \frac{30}{2.2}} \approx 7 \text{ Gp}$$

That is, the maximum bending modulus that can be expected is about 7 GPa. That is, it can be said that a composite material having a bending modulus in excess of 7 GPa deviates from the additivity range.

However, the bending moduli described in Table 1, Table 2, and Table 3 are each within the range of 4.2 to 4.6. The range is within the additivity range. The same holds true for a bending strength and a coefficient of linear expansion. Accordingly, it cannot be said that the nanocomposite effect of the composite material described in Japanese Patent Application Laid-Open No. 2004-269773 deviates from the additivity range. It should be noted that a range deviating from an additivity range in a composite optical material requiring transparency is generally about the range of twice or more for an elastic modulus, the range of half or less for a coefficient of thermal expansion, or the range of half or less for a coefficient of water absorption.

In contrast, in the present invention, a nanocomposite effect deviating from an additivity range is realized by improving the stiffness of a composite material. High stiffness refers to a state where the rotary motion of a polymer chain is restrained so that an additionally free motion is suppressed. In the present invention, attention is paid to the fact that an extremely large interaction, that is, an intermolecular force (van der Waals attraction) is exerted between two arbitrary adjacent fine particles among the respective fine particles in a synthetic resin by subjecting the fine particles to monodispersion at a predetermined interval. That is, the molecular motion of the synthetic resin among the respective fine particles is strongly restrained as long as a state where the intermolecular force is exerted is maintained, the respective fine particles do not aggregate, and the synthetic resin is present among the respective fine particles. The stiffness of the composite material can be improved by restraining the molecular motion of the synthetic resin.

That is, the nanocomposite effect in Japanese Patent Application Laid-Open No. 2004-269773 realizes improvements in mechanical properties and in dispersibility by balancing an interaction between a binding force between the synthetic resin and each of the fine particles and a repulsive force between the resin and each of the fine particles. As a result, no interaction having such a strength that the motion of a polymer chain is restrained is generated. In this case, mechanical properties are improved to some extent, but none of them can deviate from an additivity range. That is, in the case where the entire surface of each of fine particles is coated with a functional group, no intermolecular force will be generated even if an interval between two adjacent fine particles is reduced to 100 nm or less. As a result, a state where the mechanical strength of a composite optical material deviates from an additivity range cannot be realized. In contrast, in the present invention, the molecular motion of the synthetic resin among the respective fine particles can be restrained, so a nanocomposite effect deviating from an additivity range can be obtained.

Figure 5:
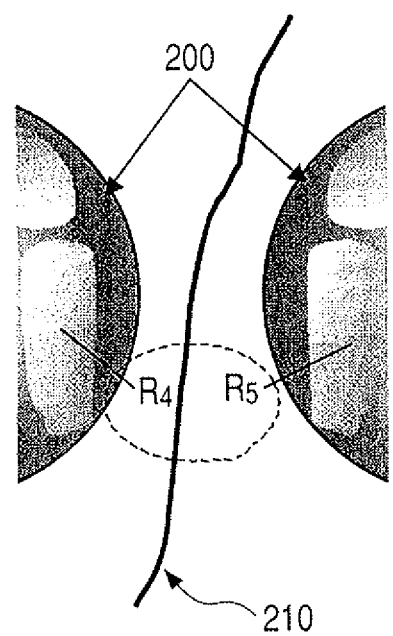
FIG. 5 is a schematic view showing a state of the optical composite material according to the present invention.

FIG. 5 is a schematic view showing a binding state between a fine particle and a synthetic resin in the present invention. In FIG. 5, reference numeral 200 represents a fine particle and reference numeral 210 represents a synthetic resin. The surfaces of the fine particles 200 are modified with functional groups ($R_4$) ($R_5$) which bond each other; provided, however, that the entire surfaces of the fine particles 200 are not coated with the functional groups ($R_4$) ($R_5$), and each of the surfaces is classified into a surface part not modified with any one of the functional groups ($R_4$) ($R_5$) and a part modified with any one of the functional groups.

In FIG. 5, an intermolecular force is exerted between the fine particles 200 at their surface parts not modified. The intermolecular force is an extremely strong force in the direction of bonding the fine particles to each other. In addition, the functional groups ($R_4$) ($R_5$) on the surfaces of the fine particles 200 exert a force on the fine particles in the direction of causing them to bond each other. The bonding force exerted by the functional groups ($R_4$) ($R_5$) serves as the steric hindrance of a bond between the fine particles against the intermolecular force, so a distance between the particles is maintained at a constant interval (i.e., in the range of 0.1 nm or more to 500 nm or less) and the fine particles do not aggregate. In this case, the mechanical physical properties of the composite material are each improved beyond an additivity range because the motion of the synthetic resin 210 between the fine particles (i.e., nanospace) is restrained. It should be noted that the repulsive force and the binding force generated between the fine particles 200 can be controlled depending on the ratios of the functional groups ($R_4$) ($R_5$) with which the surfaces of the fine particles are modified.

In addition, the coefficient of water absorption of the synthetic resin is reduced by a reduction in free volume of the composite material due to an interaction between each of the fine particles and the synthetic resin. In addition, in the present invention, an interval between two adjacent fine particles is maintained in the range of 0.1 nm or more to 500 nm or less. As a result, although the absolute amount of fine particles to be dispersed increases, nearly no light scattering occurs because the respective fine particles are uniformly subjected to monodispersion.

Embodiment

Figure 1:
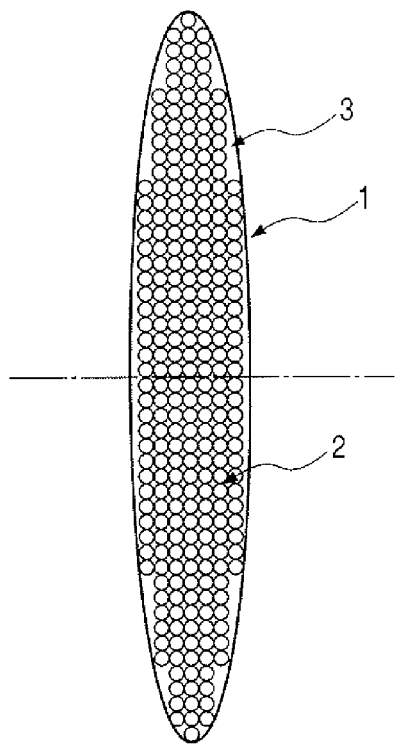
FIG. 1 is a schematic view showing an optical composite material according to the present invention.

Next, a specific embodiment of the present invention will be described. FIG. 1 shows a schematic view of the composite optical material in the present invention. In FIG. 1, a composite optical material 1 is constituted by uniformly dispersing inorganic fine particles 2 in a synthetic resin 3.

<Synthetic Resin>

First, the synthetic resin 3 according to the present invention will be described. The synthetic resin to be used in this embodiment is more preferably a transparent resin from the viewpoint of an optical property. The transparent resin can be appropriately selected from a thermoplastic resin, a thermosetting resin, and a radiation curable resin, in accordance with a mode in a molding process. Examples of the thermoplastic resin which can be used include an acrylic resin, a styrene-based resin, a polycarbonate-based resin, a polyester-based resin, an olefin-based resin, a silicone-based resin, a fluorine-based resin, a norbornene-based resin, a polyamide-based resin, a polyimid-based resin, a urethane-based resin, a polyether-based resin, a phenol-based resin, an aryl-based resin, and the thermoplastic resin composed of a copolymer of any one of the resins. In particular, the thermoplastic resin is more preferably one or two or more of an acrylic resin, a styrene-based resin, a polycarbonate-based resin, a polyester-based resin, an olefin-based resin, a silicone-based resin, a fluorine-based resin, and a polyimide-based resin, and copolymers of those, from the viewpoints of an optical property and moldability.

Further, a hardening resin to be used in this embodiment can be appropriately selected from resins such as a thermosetting resin and a radiation curable resin in accordance with a mode of a molding process. For example, a resin characterized by containing any of an acrylic resin composition, a styrene-based resin composition, a polyester-based resin composition, a urethane-based resin composition, a silicone-based resin composition, a fluorine-based resin composition, and an epoxy-based resin composition can be used. In this case, various initiators such as a thermosetting initiator and a radiation curable initiator, or a functional group in accordance with a reaction mechanism must be incorporated into the resin composition.

Further, the above-mentioned synthetic resin can be added with, as required, for example, a release agent, a plasticizer, an antioxidant, a heat stabilizer, a radiation stabilizer, a polymerization promoter, a polymerization inhibitor, a conductive agent, an antistatic agent, a coloring agent, a defoaming agent, a leveling agent, a surfactant, or a viscosity modifying agent as required to the extent that optical properties and optical stability are not impaired.

<Fine Particles>

Next, the fine particle 2 to be added to the synthetic resin 3 will be described. The fine particle 2 may be selected in accordance with an optical property desired to be imparted. To be specific, examples of the fine particle 2 which can be used include: metal oxide particles such as silicon oxide, titanium oxide, ninobium oxide, zirconium oxide, aluminum oxide, magnesium oxide, beryllium oxide, tellurium oxide, yttrium oxide, and tin indium oxide; and metal particles of gold, platinum, silver, or the like. Further, examples of the fine particle 2 which can be used include: strontium carbonate, which is known to moderate the index of double refraction of a polycarbonate resin when added thereto; calcium carbonate as a filler; metal compound particles of potassium titanium phosphate, magnesium aluminate, magnesium fluoride, calcium fluoride, or the like; inorganic particles of diamond or the like; and organic compound particles such as polystyrene latex particles.

With regard to the size of a fine particle, the fine particle preferably has a maximum length of 1 nm or more to 30 nm or less. The term "maximum length" refers to the longest diameter passing the center of gravity of a particle irrespective of the shape of the particle. The term "distance between particles" refers to a distance between the centers of gravity of the respective particles.

In addition, fine particles are added to the synthetic resin at a ratio of 0.1 vol % or more to 50 vol % or less, and a distance between two arbitrary adjacent fine particles among the added fine particles is less than 500 nm. When the amount of the fine particles is less than 0.1 vol %, a nanocomposite effect deviating from additivity cannot be exerted. In addition, it is not preferable to add the fine particles at a ratio of 50 vol % or more because good moldability inherent in the synthetic resin is remarkably impaired.

In addition, when optical stability such as an elastic modulus, a coefficient of water absorption, a coefficient of thermal expansion, or the temperature dependence of a refractive index is to be made comparable to that of optical glass as good as or better than that of a conventional optical synthetic resin, a distance between two adjacent particles is about 100 nm when the addition amount is 10 vol %, while the distance is about 500 nm when the addition amount is 50 vol %. The optical stability needed here refers to stability that is comparable to or better than that of a conventional optical glass material even under a use environment where an optical element composed of the optical glass material is used.

Functional groups are provided for the surfaces of the fine particles. In the case of a thermosetting resin, functional groups such as a (meth)acrylic group, a vinyl group, a styryl group, and a glycidyl group are provided for the surfaces of the fine particles in order that compatibility with the resin or reactivity at the time of fabrication may be imparted. A higher effect can be exerted by providing those functional groups, which can be provided for the surfaces of the fine particles by means of various approaches, for the surfaces of the fine particles via reactive double bonds in consideration of optical stability.

To be specific, the compound represented by the following formula (1) is preferably used.

$$R_m M(OR')_{n-m-1} Xl \qquad (1)$$

where R represents a functional group such as a (meth)acrylic group, a vinyl group, a styryl group, or a glycidyl group, M represents silicon, titanium, aluminum, zirconium, or tantalum, R' represents an alkyl group having 1 to 8 carbons atoms, X represents halogen, m represents an integer of 1 to n−1−l, n represents the valence number of M, and l represents an integer of 0 to n−1, and when multiple R's, R'''s, or X's are present, each of them may be the same or different from one another.

To be more specific, examples of the compound which can be used include: alkoxy compounds such as 3-acryloxypropyltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, vinyltrimethoxysilane, vinyltriethoxysilane, vinyltrichlorosilane, p-styryltrimethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, tetraethoxysilane, and tetramethoxysilane; a silane compound (i.e., amino-based silane coupling agent) having an amino organic functional group such as γ-aminopropyltriethoxysilane and N(β-aminoethyl)γ-aminopropyltrimethoxysilane; or a silane compound (i.e., vinyl-based silane coupling agent) having a vinyl group such as γ-methacryloxypropyltrimethoxysilane and γ-methacryloxypropylmethyldimethoxysilane. Further, the compound which includes tantalum, titanium, aluminum, or zirconium instead of silicon in such the silane compound may be used.

Examples of the surface modifying agent for forming the above-mentioned functional groups of fine particles include: amine-based compounds such as 6-aminohexanoic acid, 7-aminoheptanoic acid, 5-aminovalerianic acid, 3-aminocyclohexanecarboxylic acid, 12-aminolauric acid, and 4-aminocyclohexanecarboxylic acid; ester-based compounds such as methyl azelate, ethyl glutamate, methyl glutamate, monoethyl pimelate, and methyl suberate; ketone-based compounds such as 3-ferrocene propane carboxylic acid and levulinic acid; glycoside-based compounds such as glycyrrhizin and glycyrrhizic acid; and alcohol-based compounds such as 16-hydroxyhexadecanoic acid, 15-hydroxypentanedecanoic acid, 4-hydroxycyclohexanecarboxylic acid, 4-hydroxymethyl-1-cyclohexanecarboxylic acid, and lactobionic acid.

However, the fine particles must bond each other due to polar groups formed on their surfaces. It is effective to use two modifying agents in combination in order to form the polar groups bonding each other. Examples of the combination include the following. When one of the modifying agents is an amine-based modifying agent, the corresponding effective modifying agent is an ester-based modifying agent, a ketone-based modifying agent, a glycoside-based modifying agent, and an alcohol-based modifying agent. When one of the modifying agents is an ester-based modifying agent, the corresponding effective modifying agent is an amine-based modifying agent, a glycoside-based modifying agent, and an alcohol-based modifying agent. When one of the modifying agents is a ketone-based modifying agent, the corresponding effective modifying agent is an amine-based modifying agent, a glycoside-based modifying agent, and an alcohol-based modifying agent. When one of the modifying agents is a glycoside-based modifying agent, the corresponding effective modifying agent is an amine-based modifying agent, an ester-based modifying agent, a ketone-based modifying agent, and an alcohol-based modifying agent. When one of the modifying agents is an alcohol-based modifying agent, the corresponding effective modifying agent is an amine-based modifying agent, an ester-based modifying agent, a ketone-based modifying agent, and a glycoside-based modifying agent.

The surface of each of the fine particles 2 in the present invention is modified in a state where the surface is classified into a surface part not modified with a modifying agent and a part modified with the modifying agent. A state where the surface of each of the fine particles is modified can be controlled depending on a time period for which the surface is allowed to react with a modifying agent. The parts of the surfaces of the fine particles not modified with any modifying agent try to aggregate with the aid of an intermolecular force between two adjacent fine particles. However, a chemical bond between two adjacent modified parts serves as steric hindrance, so a distance between two adjacent particles is maintained at a constant interval.

A method of chemically modifying the surfaces of the fine particles in accordance with the above-mentioned respective modifying agents will be specifically described. A synthetic resin adaptable to the present invention is not particularly limited as long as a synthetic resin, particles, and various additives that can be used satisfy: desired optical stability such as an elastic modulus, a coefficient of water absorption, a coefficient of thermal expansion, or the temperature dependence of a refractive index; a desired light-scattering rate; a desired refractive index; desired wavelength dispersibility of the refractive index; and desired secondary dispersibility.

(Method of Synthesizing Metal Oxide Fine Particles Coated with Amine-Based Surface Modifying Agent)

5 g of metal oxide fine particles are mixed into an aqueous solution of 6-aminohexanoic acid prepared by dissolving 10 g of 6-aminohexanoic acid in 90 g of pure water. After the mixing, the aqueous solution mixed with the metal oxide fine particles is heated at about 100° C. for about 2 hours so that the aqueous solution is subjected to evaporation to dryness. As a result, metal oxide fine particles coated with an amine-based surface modifying agent are obtained. Here, another amine-based surface modifying agent such as 7-aminoheptanoic acid, 5-aminovalerianic acid, 3-aminocyclohexanecarboxylic acid, 12-aminolauric acid, or 4-aminocyclohexanecarboxylic acid is also suitable.

(Method of Synthesizing Metal Oxide Fine Particles Coated with Ester-Based Surface Modifying Agent)

5 g of metal oxide fine particles are mixed into an aqueous solution of methyl azelate prepared by dissolving 10 g of methyl azelate in 90 g of pure water. After the mixing, the aqueous solution mixed with the metal oxide fine particles is heated at about 100° C. for about 2 hours so that the aqueous solution is subjected to evaporation to dryness. As a result, metal oxide fine particles coated with an ester-based surface modifying agent are obtained.

Here, another ester-based surface modifying agent such as ethyl glutamate, methyl glutamate, monoethyl pimelate, or methyl suberate is also suitable.

(Method of Synthesizing Metal Oxide Fine Particles Coated with Ketone-Based Surface Modifying Agent)

5 g of metal oxide fine particles are mixed into an aqueous solution of 3-ferrocene propane carboxylic acid prepared by dissolving 10 g of 3-ferrocene propane carboxylic acid in 90 g of pure water. After the mixing, the aqueous solution mixed with the metal oxide fine particles is heated at about 100° C. for about 2 hours so that the aqueous solution is subjected to evaporation to dryness. As a result, metal oxide fine particles coated with a ketone-based surface modifying agent are obtained. Here, another ketone-based surface modifying agent such as levulinic acid is also suitable.

(Method of Synthesizing Metal Oxide Fine Particles Coated with Glycoside-Based Surface Modifying Agent)

5 g of metal oxide fine particles are mixed into an aqueous solution of glycyrrhizin prepared by dissolving 10 g of glycyrrhizin in 90 g of pure water. After the mixing, the aqueous solution mixed with the metal oxide fine particles is heated at about 100° C. for about 2 hours so that the aqueous solution is subjected to evaporation to dryness. As a result, metal oxide fine particles coated with a glycoside-based surface modifying agent are obtained. Here, another glycoside-based surface modifying agent such as glycyrrhizic acid is also suitable.

(Method of Synthesizing Metal Oxide Fine Particles Coated with Alcohol-Based Surface Modifying Agent)

5 g of metal oxide fine particles are mixed into an aqueous solution of 16-hydroxyhexadecanioc acid prepared by dissolving 10 g of hydroxyhexadecanioc acid in 90 g of pure water. After the mixing, the aqueous solution mixed with the metal oxide fine particles is heated at about 100° C. for about 2 hours so that the aqueous solution is subjected to evaporation to dryness. As a result, metal oxide fine particles coated with an alcohol-based surface modifying agent are obtained. Here, another alcohol-based surface modifying agent such as 15-hydroxypentanedecanoic acid, 4-hydroxycyclohexanecarboxylic acid, 4-hydroxymethyl-1-cyclohexanecarboxylic acid, or lactobionic acid is also suitable.

Note that examples of the fine particle dispersant include polyol, alkanolamine, alkylsulfonate, a titanium coupling agent, and a silane coupling agent.

<Method of Producing Composite Optical Material>

A method of dispersing the fine particles in the synthetic resin is not particularly limited as long as the above-mentioned dispersed state is achieved, so any one of various methods can be employed. The particles can be directly dispersed in the synthetic resin by a direct dispersion method with, for example, a roll, a kneader, an internal mixer, or a uniaxial, biaxial, or multiaxial kneading machine. In addition, at the time of the dispersion, the following procedure may be adopted as required: the particles are uniformly dispersed in a dispersion solvent in advance by using, for example, a ball mill, a bead mill, an ultrasonic mill, a sand mill, a disk mill, a homogenizer, or an ultrasonic homogenizer, and the resultant is mixed with the synthetic resin.

In general, the fine particles are often present in a state of the aggregate of primary particles. It cannot be said that the state is preferable when high dispersibility of the fine particles is required. Accordingly, in order that high dispersibility by primary particles is realized, an operation for crushing the aggregate of the fine particles by using any one of various dispersing devices is useful. However, the crushed fine particles may re-aggregate due to the exposure of surfaces each having additionally high chemical activity. In view of the foregoing, it is more preferable to treat the surfaces of the fine particles during a dispersion operation, for suppressing the re-aggregation and additionally improving the dispersibility of the fine particles and an interaction between a matrix resin and each of the fine particles. As a result of the surface treatment, the active surfaces are protected without causing re-aggregation, so a larger number of functional groups can be provided for the surfaces of the fine particles than that in the case where no dispersion operation is performed.

In addition, when the matrix resin is a thermosetting resin, a dispersion solvent that can be used is not limited to a general dispersion solvent such as water or an organic solvent. To be more specific, the fine particles can be dispersed in at least one or more resin components of the matrix resin. The dispersion eliminates the need for performing an operation for removing the dispersion solvent that becomes unnecessary after the dispersion operation, so an optical composite material can be produced with more ease.

Alternatively, the above-mentioned dispersed state may be embodied by forming the synthetic resin or the particles by an in-situ method. When dispersibility or an interaction between each of the particles and the synthetic resin is insufficient, the polymer chain, side chains, terminals, and the like of the synthetic resin may be denatured, or the surfaces of the particles may be subjected to, for example, treatment or modification as required. Alternatively, a dispersant can be used. A surface treatment agent and the dispersant are as described above.

Here, a relationship among the dispersed state, transmittance, and scattering property of a composite material will be described. When the composite material is used in optical applications, it is necessary to reduce a light-scattering rate so that the light-scattering rate is sufficient for practical use as well as, of course, to increase an internal transmittance. In general, the scattering property of an optical material obtained by dispersing particles different from each other in refractive index in a certain substance largely changes depending on the dispersed state of each of the particles. A light-scattering rate sufficient for practical use in this case refers to a light-scattering rate of less than 1% for an optical path length of 100 μm, and a light-scattering rate of less than 1% for an optical path length of 1 mm is additionally suitable. In order that light scattering in a visible light region may be suppressed, the maximum length of each of the particles must be controlled to at least 100 nm or less, or preferably 30 nm or less. Therefore, the aggregate of the fine particles may be present to the extent that the scattering property is not largely reduced.

EXAMPLES

Example 1

EXAMPLE 1 shows the case where 5 vol % of metal oxide fine particles which had polar groups capable of reacting with each other and whose surfaces had been modified were melted and kneaded in and reacted with a thermoplastic polymer, the fine particles here being silica fine particles having an average particle size of 5 nm.

First, silica fine particles whose surfaces had been modified with 6-aminohexanoic acid and subjected to evaporation to dryness and silica fine particles whose surfaces had been modified with methyl azelate were weighed in equal amounts, and a thermoplastic acrylic resin (Delpet 80N/manufactured by Asahi Kasei Corporation) was added to them. Next, the acrylic resin and the silica fine particles having polar groups capable of reacting with each other were melted and kneaded by using a biaxial kneading machine (UL Tnano05/manufactured by Technovel Corporation) shown in FIGS. 2A and 2B. It should be noted that, although the biaxial kneading machine was used in this example, a multiaxial machine such as a quadruple screw can be used for additionally improving kneading energy. In addition, it is additionally suitable to apply an electromagnetic wave such as a microwave, an X-ray, or a γ-ray to an arbitrary place during kneading to provide the silica fine particles or the acrylic resin with energy. In particular, with regard to a place to which an electromagnetic wave is applied, higher efficiency is obtained when the electromagnetic wave is applied from a screw tip portion to a die portion.

Figure 2A:
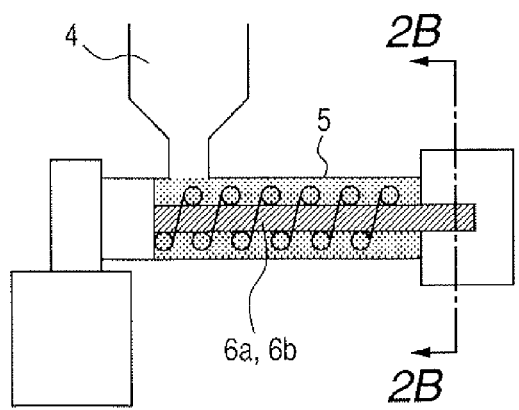
FIGS. 2A and 2B are each a sectional view showing a biaxial kneading machine for producing the optical composite material according to the present invention.
Figure 2B:
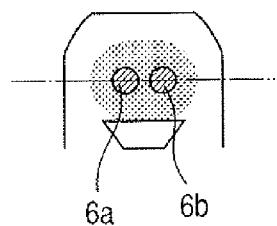

FIG. 2A is a sectional view of the biaxial kneading machine seen from a transverse direction, and FIG. 2B is a sectional view of the biaxial kneading machine taken along the line 2B-2B of FIG. 2A. The acrylic resin added with the fine particles described above and loaded from a hopper 4 was kneaded by screws 6a and 6b built in a cylinder 5. The screws 6a and 6b of the biaxial kneading machine each had a diameter of 15 mm and a ratio L (screw length)/D (screw diameter) of 10. Conditions for the kneading were as follows: the rotational speed of each of the screws 6a and 6b was 100 rpm, and a kneading time was the time required for the silica fine particles to be primarily dispersed in the acrylic resin.

With the biaxial kneading machine, an amino group of 6-aminohexanoic acid and an ester site of methyl azelate, 6-aminohexanoic acid and methyl azelate modifying the surfaces of the silica fine particles, are gradually reacted with each other. As a result, a hydrogen bond was formed between two silica fine particles to start restraining the motion of the polymer chain of the acrylic resin. The thickness of an organic layer between the silica fine particles was observed with a transmission electron microscope (TEM). As a result, the thickness was about 2 nm.

Figure 3:
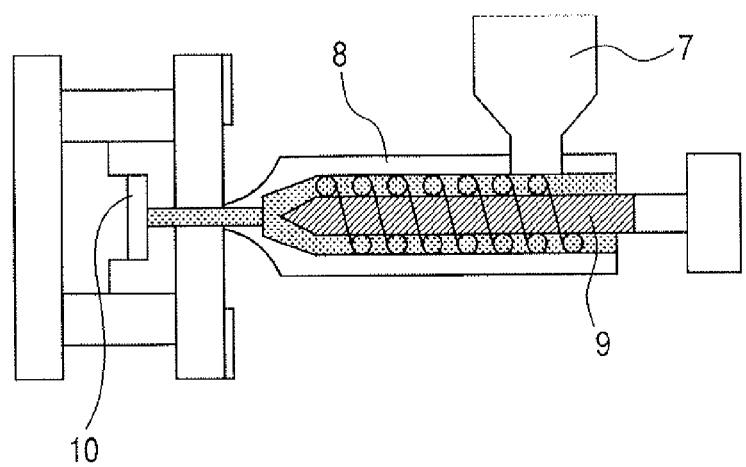
FIG. 3 shows an injection molding machine for molding a plastic lens by using the optical composite material according to the present invention.

Next, a composite material obtained by adding the silica fine particles to the acrylic resin was pelletized by using a pelletizer (not shown), and was then loaded into a hopper 7 of an injection molding machine (injection molding machine SE7M (trade name) manufactured by Sumitomo Heavy Industries, Ltd.) shown in FIG. 3. The composite material loaded into the hopper 7 was melted and kneaded by a screw 9 built in a cylinder 8, and was then injected into a molding die 10. The molding die 10 was a die provided with a side gate, whose both surfaces each had specular gloss. Conditions for the injection molding were as follows: a die temperature was 70° C. and a molding temperature was 240° C. Thus, a test piece measuring 50 mm by 50 mm by 1 mm was molded.

Next, the composite material in the present invention was produced, and its mechanical physical properties and optical physical properties were measured as described below.

(Measurement of Transmittance)

With regard to a transmittance, the lowest transmittance of the test piece in a visible light wavelength region (i.e., 380 nm or more to 780 nm or less) was measured by using a spectrophotometer U-4000 (trade name) manufactured by Hitachi, Ltd.

(Measurement of Elastic Modulus)

The elastic modulus of the test piece at 25° C. was measured by using a dynamic viscoelasticity measuring device Rheosol-G3000 (trade name) manufactured by UBM.

(Measurement of Coefficient of Thermal Expansion)

The coefficient of thermal expansion of the test piece at an arbitrary temperature in the range of 0° C. to 50° C. was measured by using an apparatus for thermomechanical analysis TMA400 (trade name) manufactured by TA Instruments.

(Measurement of Coefficient of Water Absorption)

A coefficient of water absorption was measured by: immersing the test piece in pure water for 24 hours; and measuring a weight change before and after the immersion.

(Measurement of Refractive Index)

The refractive index of the test piece was measured by using an Abbe's refractometer KPR-30A (trade name) manufactured by KALNEW Co., Ltd. at a wavelength of 588 nm and a temperature of 25° C.

(Measurement of Change in Refractive Index with Temperature)

The value of a change in refractive index of the test piece with temperature for light having a wavelength of 588 nm was measured in the temperature range of 0° C. to 50° C. by using an Abbe's refractometer KPR-30A (trade name) manufactured by KALNEW Co., Ltd.

(Measurement of Scattering Rate)

With regard to a scattering rate, the highest scattering rate of the test piece in a visible light wavelength region (i.e., 380 nm or more to 780 nm or less) was measured by using a spectrophotometer U-4000 (trade name) manufactured by Hitachi, Ltd.

Evaluation for the dispersibility of the particles was performed by subjecting an image of the test piece obtained by using a transmission electron microscope (TEM, manufactured by JEOL, Ltd.) to image processing with an Image-Pro Plus (trade name) manufactured by Media Cybernetics, Inc. A distance between the center of gravity of a particle having a maximum length of 30 nm or less and the center of gravity of a particle having a maximum length of 30 nm or less and most adjacent to the particle which is less than 100 nm was regarded as being good, while a distance similarly defined as 100 nm or more was regarded as being bad.

In addition, a ratio of the number of aggregates to the number of non-aggregates which is less than 0.1 was regarded as being good, while a ratio similarly defined as 0.1 or more was regarded as being bad. The number of aggregates and the number of non-aggregates were counted by: subjecting the image to image processing by using an Image-Pro Plus (trade name) manufactured by Media Cybernetics, Inc. in a range in which an area becomes 1 µm×1 µm; and counting the number of aggregates and the number of non-aggregates in that range.

(SP Value Ratio)

The SP values of the surfaces of the fine particles and the composite material were determined by the Fedors method, and a ratio among the values was calculated.

Table 1 shows the mechanical physical properties and optical physical properties of the composite material thus measured. The composite material in this example had an elastic modulus of 15.0 GPa, a coefficient of thermal expansion of $1.4 \times 10^{-5}/°$ C., and a coefficient of water absorption of 0.1%. In addition, here, the particle size of each of the silica fine particles primarily dispersed in the acrylic resin and a distance between two adjacent particles among the fine particles were observed with a transmission electron microscope (TEM). As a result, the particle size of each of the silica fine particles was 5 nm, and a distance between the surfaces of two adjacent particles was about 4 nm. Further, a ratio of the number of aggregates to the number of non-aggregates was calculated by way of image processing. As a result, the ratio was 0.05. This means that the fine particles showed good dispersibility.

The acrylic resin alone had an elastic modulus of about 3.0 GPa, a coefficient of thermal expansion of about $7.0 \times 10^{-5}/°$ C., and a coefficient of water absorption of 0.4%. In contrast, the acrylic resin of EXAMPLE 1 in which the silica fine particles had been uniformly dispersed had an elastic modulus of about five times as that of the acrylic resin alone, a coefficient of thermal expansion which was about one fifth to that of the acrylic resin alone, and a coefficient of water absorption which was one fourth to that of the acrylic resin alone, and showed a transmittance of 89.5% and a scattering rate of 0.8%. That is, the resultant acrylic resin had mechanical physical properties each deviating from the additivity range of the composite material, and had good optical properties.

Example 2

EXAMPLE 2 shows the case where 0.1 vol % of metal oxide fine particles which had polar groups capable of reacting with each other and whose surfaces had been modified were reacted through liquid dispersal in a thermosetting polymer, the fine particles here being silica fine particles having an average particle size of 30 nm.

First, silica fine particles obtained by modifying the surfaces of silica fine particles having an average particle size of about 30 nm with 16-hydroxyhexadecanoic acid and silica fine particles obtained by modifying the surfaces of silica fine particles having an average particle size of about 30 nm with 3-ferrocenepropanecarboxylic acid were weighed and added to methyl methacrylate (MMA). Next, MMA and titanium oxide fine particles having polar groups capable of reacting with each other were subjected to liquid dispersion by using a bead mill (UltraApex Mill/manufactured by KOTOBUKI INDUSTRIES CO., LTD.) (not shown).

First, MMA and the silica fine particles whose surfaces had been modified were subjected to a homogenizer in such a manner that coarse aggregated fine particles were crushed, and the resultant was defined as a dispersion stock solution. The dispersion stock solution was charged into a stirring container (not shown) of the bead mill. Fine particles each having a particle size of 0.03 mm and each made of zirconia were used as fine particles to be stirred by the bead mill machine. The fine particles to be stirred were loaded in such a manner that a ratio of the fine particles to the stirring container would be 60 vol %. The number of revolutions of the bead mill machine was 5,000 rpm, and stirring was performed for 48 hours. The particle size distribution of the fine particles in the dispersion liquid thus obtained was measured with a laser particle size distribution meter. The measurement confirmed that the fine particles were primarily dispersed to have an average particle size of 30 nm. After that, the composite material obtained by using the bead mill was cast at the center between two glass substrates opposite to each other with spacers each having a thickness of 1 mm arranged at the four corners of the space between the glass substrates. After that, the composite material was developed while being brought into close contact with the glass substrates, and was then heated by using a hot plate to be cured with the heat. After that, the composite material formed between the glass substrates was peeled off of the glass substrates, whereby a measurement sample was obtained. The mechanical physical properties and optical physical properties of the test piece thus molded were measured according to the same mode as that of EXAMPLE 1.

As shown in Table 1, the test piece in this example had an elastic modulus of 7 (GPa), a coefficient of thermal expansion of ($2.3 \times 10^{-5}/°$ C.), and a coefficient of water absorption of 0.15%. In addition, the particle size of each of the silica fine particles primarily dispersed in PMMA and a distance between two adjacent particles among the fine particles were observed with a transmission electron microscope (TEM). As a result, silica fine particles each having a particle size of about 30 nm were dispersed, and a distance between the surfaces of two adjacent particles was about 280 nm. Further, in evaluation for dispersibility by using a TEM image, the fine particles showed good dispersibility. That is, the mechanical physical properties and optical properties each deviating from the additivity range of the composite material were attained.

Example 3

EXAMPLE 3 shows the case where 10 vol % of metal oxide fine particles which had polar groups capable of reacting with each other and whose surfaces had been modified were reacted through liquid dispersal in a thermosetting polymer, the fine particles here being silica fine particles having an average particle size of 1 nm.

First, silica fine particles obtained by modifying the surfaces of silica fine particles having an average particle size of about 1 nm with 3-ferrocenepropanecarboxylic acid and silica fine particles obtained by modifying the surfaces of silica fine particles having an average particle size of about 1 nm with 5-aminovalerianic acid were weighed and added to methyl methacrylate (MMA). Next, MMA and silica fine particles having polar groups capable of reacting with each other were subjected to liquid dispersion by using a bead mill (UltraApex Mill/manufactured by KOTOBUKI INDUSTRIES CO., LTD.) (not shown).

First, MMA and the silica fine particles whose surfaces had been modified were subjected to a homogenizer in such a manner that coarse aggregated fine particles were crushed, and the resultant was defined as a dispersion stock solution. The dispersion stock solution was charged into a stirring container of the bead mill. Fine particles each having a particle size of 0.03 mm and each made of zirconia were used as fine particles to be stirred by the bead mill machine. The fine particles to be stirred were loaded in such a manner that a ratio of the fine particles to the stirring container would be 60 vol %. The number of revolutions of the bead mill machine was 5,000 rpm, and stirring was performed for 48 hours. The particle size distribution of the fine particles in the dispersion liquid thus obtained was measured with a laser particle size distribution meter. The measurement confirmed that the fine particles were primarily dispersed to have an average particle size of 1 nm. After that, the mechanical physical properties and optical physical properties of the test piece were measured by molding a test piece in the same manner as in EXAMPLE 2.

As shown in Table 1, the test piece in this example had an elastic modulus of 15.5 (GPa), a coefficient of thermal expansion of ($1.3 \times 10^{-5}/°$ C.), and a coefficient of water absorption of 0.15%. In addition, here, the particle size of each of the silica fine particles primarily dispersed in PMMA and a distance between two adjacent particles among the fine particles were observed with a transmission electron microscope (TEM). As a result, silica fine particles each having a particle size of about 1 nm were dispersed without secondary aggregation, and a distance between the surfaces of two adjacent particles was about 0.4 nm. Further, in evaluation for dispersibility by using a TEM image, the fine particles had good dispersibility. That is, the mechanical physical properties and optical properties each deviating from the additivity range of the composite material were attained.

Example 4

This example shows the case where a composite material was prepared by adding 20 vol % of titania particles to an acrylic resin by using a biaxial kneading extrusion machine. A Delpet 80N (manufactured by Asahi Kasei Corporation) was used as the acrylic resin, and particles having an average particle size of 15 nm (manufactured by TAYCA Corporation) were used as the titania particles. The resin and the particles were preliminarily dried at 100° C. for 18 hours. After that, the resultant was melted and kneaded by using a biaxial kneading extrusion machine (manufactured by Imoto Machinery Co., Ltd.) having a screw diameter of 15 mm and a ratio L/D of 25. The rotational speed of the screw was 75 rpm. After having been cooled with water, the resultant resin was pelletized by using a pelletizer, whereby a composite material was obtained. The resultant composite material was molded into a test piece in the same manner as in EXAMPLE 1, and the mechanical physical properties and optical properties of the test piece were measured. Table 1 shows the results.

The test piece showed a transmittance and a scattering rate enough for the test piece to be used in an optical material. The addition of the fine particles increased an elastic modulus from before the addition, that is, the elastic modulus increased from 3.2 GPa, to 7.1 GPa. The addition reduced a coefficient of thermal expansion from before the addition, that is, the coefficient of thermal expansion decreased from 60 ppm to 22 ppm. The addition reduced a coefficient of water absorption from before the addition, that is, the coefficient of water absorption decreased from 2.2% to 0.2%. The addition increased a refractive index from before the addition, that is, the refractive index increased from 1.491 to 1.674. The temperature dependence of the refractive index was alleviated to 0.00009/° C., so the test piece showed optical properties useful in optical design. Further, in evaluation for dispersibility by using a TEM image, the test piece showed excellent dispersibility satisfying the above-mentioned evaluation criteria. That is, mechanical physical properties and optical properties each deviating from the additivity range of the composite material were attained.

Example 5

In this example, after an operation for dispersing zirconium oxide particles by using a bead mill, the surfaces of the particles were modified, and then a composite material was prepared by adding a UV curable acrylic monomer in such a manner that a ratio of the zirconium oxide particles would be 10 vol %. An RC-C001 (manufactured by DAINIPPON INK AND CHEMICALS, INCORPORATED) was used as the UV curable acrylic monomer, and zirconium oxide (manufactured by C.I. KASEI Co., Ltd.) particles having an average particle size of 7 nm were used.

First, coarse aggregated particles were crushed by using a homogenizer, and the resultant was defined as a dispersion stock solution. The dispersion stock solution was charged into a stirring container of a bead mill (UltraApex Mill/manufactured by KOTOBUKI INDUSTRIES CO., LTD.). Particles each having a particle size of 0.03 mm and each made of zirconia were used as particles to be stirred by the bead mill machine. The particles to be stirred were loaded in such a manner that a ratio of the particles to the stirring container would be 60 vol %. The number of revolutions of the bead mill machine was 5,000 rpm, and stirring was performed for 3 hours. After that, 3-acryloxypropyltrimethoxysilane was added and the whole was stirred for 24 hours. After that, a photocurable acrylic monomer was added in such a manner that a ratio of the zirconium oxide particles would be 10 vol %, and the whole was stirred for 21 hours, whereby a composite material was obtained. At this time, a ratio between the SP values of: the surface of each of the fine particles treated with 3-acryloxypropyltrimethoxysilane; and the RC-C001 (manufactured by DAINIPPON INK AND CHEMICALS, INCORPORATED) was 0.83.

Next, the composite material was cast at the center between two glass substrates opposite to each other with spacers each having a thickness of 1 mm arranged at the four corners of the space between the glass substrates. Then, the composite material was developed while being brought into close contact with the glass substrates. After that, the composite material was cured with ultraviolet light at a dose of 1,000 mJ/cm$^2$ by using a spot UV lighting system EXECURE 3000 (trade name) manufactured by HOYA CANDEO OPTRONICS CORPORATION. After that, the composite resin molded article formed between the glass substrates was peeled off of the glass substrates, whereby a measurement sample was obtained. The mechanical physical properties and optical physical properties of the test piece thus molded were measured according to the same mode as that of EXAMPLE 1.

The test piece showed a transmittance and a scattering rate enough for the test piece to be used in an optical material. The addition of the fine particles increased an elastic modulus from before the addition, that is, the elastic modulus increased from 3.0 GPa to 7.2 GPa. The addition reduced a coefficient of thermal expansion from before the addition, that is, the coefficient of thermal expansion decreased from 53 ppm to 25 ppm. Further, the addition reduced a coefficient of water absorption from before the addition, that is, the coefficient of water absorption decreased from 1.9% to 0.5%. The addition increased a refractive index from before the addition, that is, the refractive index increased from 1.524 to 1.562. The temperature dependence of the refractive index was alleviated to 0.00008/° C., so the test piece showed optical properties useful in optical design. Further, in evaluation for dispersibility by using a TEM image, the test piece showed excellent dispersibility satisfying the above-mentioned evaluation criteria. That is, mechanical physical properties and optical properties each deviating from the additivity range of the composite material were attained.

Example 6

In this example, after an operation for dispersing aluminum oxide particles by using a bead mill, the surfaces of the particles were modified, and then a composite material was prepared by adding a thermosetting resin in such a manner that a ratio of the aluminum oxide particles would be 50 vol %. Diethylene glycol bisallyl carbonate was used as the thermosetting resin, and zirconium oxide (manufactured by C.I. KASEI Co., Ltd.) particles having an average particle size of 20 nm were used.

First, the above-mentioned resin and particles were subjected to a homogenizer in such a manner that coarse aggregated particles were crushed, and the resultant was defined as a dispersion stock solution. The dispersion stock solution was charged into a stirring container of a bead mill (UltraApex Mill/manufactured by KOTOBUKI INDUSTRIES CO., LTD.). Particles each having a particle size of 0.03 mm and each made of zirconia were used as particles to be stirred by the bead mill machine. The particles to be stirred were loaded in such a manner that a ratio of the particles to the stirring container would be 60 vol %. The number of revolutions of the bead mill machine was 5,000 rpm, and stirring was performed for 3 hours. After that, vinyltriethoxysilane was added, and the whole was stirred for 24 hours. After that, diethylene glycol bisallyl carbonate was added in such a manner that a ratio of the aluminum oxide particles would be 50 vol %, and the whole was stirred for 21 hours, whereby a composite material was obtained. After that, a test piece was molded in the same manner as in EXAMPLE 2, and its mechanical physical properties and optical physical properties were measured. Table 1 shows the results.

The test piece showed a transmittance and a scattering rate enough for the test piece to be used in an optical material. The addition of the fine particles increased an elastic modulus from before the addition, that is, the elastic modulus increased from 4.2 GPa to 9.2 GPa. The addition reduced a coefficient of thermal expansion from before the addition, that is, the coefficient of thermal expansion decreased from 110 ppm to 45 ppm. The addition reduced a coefficient of water absorption from before the addition, that is, the coefficient of water absorption decreased from 3.0% to 0.5%. Further, the addition increased a refractive index from before the addition, that is, the refractive index increased from 1.498 to 1.606. The temperature dependence of the refractive index was alleviated to 0.00006/° C., so the test piece showed optical properties useful in optical design. Further, in evaluation for dispersibility by using a TEM image, the test piece showed excellent dispersibility. That is, mechanical physical properties and optical properties each deviating from the additivity range of the composite material were attained.

Example 7

In this example, polystyrene latex particles known to be capable of producing beautiful spherical fine particles were used as fine particles to be added. In addition, a method involving performing the production of the polystyrene latex particles and the dispersion of the particles in the side of a composite material in a micro space, that is, a reaction field (i.e., microreactor method) was adopted, and a method involving performing the production of the fine particles and the dispersion of the fine particles in a synthetic resin simultaneously is shown. In addition, unlike any one of the above examples, a resin (i.e., polystyrene latex particles) was used as nano-fine particles to be used.

As disclosed in, for example, Japanese Patent Application Laid-Open No. 2005-046650, a microreactor is a novel production process using a minute container. The microreactor is provided with minute spaces (i.e., mixed reaction flow channels) connected to multiple fine fluid feed channels and each having an equivalent diameter when its section is converted into a circular shape (i.e., circle-equivalent diameter) of about several micrometers to several hundreds of micrometers. The microreactor is a device for mixing multiple fluids or causes a chemical reaction together with the mixing by merging the multiple fluids with the minute spaces through the multiple fluid feed channels.

In this example, three fluids (i.e., three raw materials) were used as raw materials. Therefore, a microreactor (not shown) composed of three feed channels A, B, and C, and a discharge channel D was used. The order in which the fluids were mixed was as described below. First, the fluids of the channels A and B were mixed, and the mixture was mixed with the fluid of the channel C. The mixture of the three fluids was passed through the channel D, and was then discharged from the channel.

An adopted approach was as follows: a commercially available material such as a material under the trade name of micromer (trade name 01-00-151: COREFRONT Corporation, average particle size of 15 nm, no surface treatment) was used in the polystyrene latex particles used in this example, and the particles were dispersed in a resin while their surfaces were treated by the microreactor method. Alternatively, it is also additionally suitable to adopt such an approach as disclosed in, for example, Japanese Patent Application Laid-Open No. 2004-352812, involving: adding polyethylene glycol octylphenyl ether as a nonionic emulsifier and potassium persulfate as a polymerization initiator to pure water to synthesize polystyrene latex particles by using, for example, a method involving a temperature increase; and treating the surfaces of the particles and dispersing the particles in a synthetic resin simultaneously with the synthesis.

In addition, 3-methacryloxypropyltriethoxysilane (trade name KBM503: manufactured by Shin-Etsu Chemical Co., Ltd.) was used as an agent for treating the surfaces of the polystyrene latex particles. In addition, a UV curable acrylic monomer (trade name Adeka Optomer: manufactured by Asahi Denka Kogyo K.K.) was used as a composite material.

Next, a specific production method will be described. First, the channel A was fed with polystyrene latex particles (trade name: microme, particle concentration of 25 mg/ml, ethanol solvent) at an arbitrary flow rate. Next, the channel B was fed with the above-mentioned surface treatment agent 3-methacryloxypropyltriethoxysilane (trade name KBM503: manufactured by Shin-Etsu Chemical Co., Ltd.) at the same flow rate. The observation of the polystyrene latex particles whose surfaces had been treated, with an electron microscope JEM-3010 (trade name) manufactured by JEOL Ltd. described above in the above state confirmed the presence of an organic layer having a thickness of about 5 nm on the surface of each of the particles. It can be inferred from the result that preparation at a particle concentration of about 5 vol % was attained.

Further, the raw materials of the channels A and B were mixed in a micro channel having the temperature adjusted to a range of 60 to 70° C. After that, the mixture was mixed with a UV curable resin Adeka Optomer (manufactured by Asahi Denka Kogyo K.K.) fed from the channel C at the same flow rate, and finally, a dispersion sol of the three raw materials was collected from the channel D. The amount and flow rate of each of the raw materials to be loaded may be arbitrarily set, or the temperature of a reaction field may be arbitrarily controlled depending on a desired particle size, a desired particle concentration, and the desired thickness of a surface organic layer, and an arbitrary shape and an arbitrary form can be used for the microreactor.

The polystyrene latex particles dispersed in the synthetic resin thus obtained seemed to be dispersed well because their surfaces were treated, and showed excellent dispersibility in evaluation for dispersibility by using a TEM image.

Further, as described above, the resultant mixed material was cast at the center between two glass substrates opposite to each other with spacers each having a thickness of 200 µm arranged at the four corners of the space between the glass substrates, and was then developed while being brought into close contact with the glass substrates. Then, the material was cured with light at a dose of 1,000 mJ/cm$^2$ by using a spot UV lighting system EXECURE 3000 (trade name) manufactured by HOYA CANDEO OPTRONICS CORPORATION. After that, the composite resin molded article formed between the glass substrates was peeled off of the glass substrates, whereby a measurement sample was obtained. Table 1 shows the results of the measurement of the sample. The results of Table 1 confirmed that the composite material in this example had mechanical physical properties and optical properties each deviating from an additivity range.

As described above, the utilization of a microreactor using a micro space as a reaction field provides an ideal nanocomposite material. According to this utilization, mechanical physical properties that have not been conventionally conceivable can be obtained even when a material to be added is not a material having high rigidity (such as a high elastic modulus, a high hardness, a low coefficient of thermal expansion, or a low coefficient of water absorption) such as an inorganic material. This proves not that a nanocomposite effect conforms to the so-called sum of the volume fractions of physical properties (i.e., rule of mixtures) but that the creation of an ideal state restrains the motion of an organic material or a synthetic resin present between or around particles due to an interaction between the particles.

Comparative Example 1

COMPARATIVE EXAMPLE 1 shows the case where 0.02 vol % of metal oxide fine particles which have polar groups capable of reacting with each other and whose surfaces have been modified are reacted in a thermosetting polymer due to liquid dispersion, the fine particles here being silica fine particles having an average particle size of 30 nm.

MMA and the silica fine particles having polar groups capable of reacting with each other were subjected to liquid dispersion by using a bead mill (UltraApex Mill/manufactured by KOTOBUKI INDUSTRIES CO., LTD.) (not shown) in the same manner as in EXAMPLE 2.

First, MMA and the silica fine particles whose surfaces had been modified were subjected to a homogenizer in such a manner that coarse aggregated fine particles were crushed, and the resultant was defined as a dispersion stock solution. The dispersion stock solution was charged into a stirring container of the bead mill. Fine particles each having a particle size of 0.03 mm and each made of zirconia were used as fine particles to be stirred by the bead mill machine. The fine particles to be stirred were loaded in such a manner that a ratio of the fine particles to the stirring container would be 60 vol %. The number of revolutions of the bead mill machine was 5,000 rpm, and stirring was performed for 48 hours. The particle size distribution of the fine particles in the dispersion liquid thus obtained was measured with a laser particle size distribution meter. The measurement confirmed that the fine particles were primarily dispersed to have an average particle size of 30 nm. After that, the composite material obtained by using the bead mill was molded into a test piece according to the same mode as that of EXAMPLE 2. The mechanical physical properties and optical physical properties of the test piece thus molded were measured according to the same mode as that of EXAMPLE 1.

The particle size of each of the silica fine particles primarily dispersed in PMMA and a distance between two adjacent particles among the fine particles at this time were observed with a transmission electron microscope (TEM). As a result, silica fine particles each having a particle size of about 30 nm were dispersed without causing secondary aggregation, and a distance between the surfaces of two adjacent particles was about 660 nm. Further, in evaluation for dispersibility by using a TEM image, the fine particles showed good dispersibility.

However, as shown in Table 1, the test piece in this comparative example had an elastic modulus of 3.5 (GPa), a coefficient of thermal expansion of ($6.5 \times 10^{-5}$/° C.), and a coefficient of water absorption of 0.35%. Therefore, mechanical physical properties each deviating from the additivity range of the composite material could not be exerted.

Comparative Example 2

COMPARATIVE EXAMPLE 2 shows the case where 15 vol % of metal oxide fine particles which had polar groups capable of reacting with each other and whose surfaces had been modified are reacted in a thermosetting polymer due to liquid dispersion, the fine particles here being silica fine particles having an average particle size of 1 nm.

First, silica fine particles obtained by modifying the surfaces of silica fine particles having an average particle size of about 1 nm with 12-aminolauric acid and silica fine particles obtained by modifying the surfaces of silica fine particles having an average particle size of about 1 nm with 5-aminovalerianic acid were weighed and added to methyl methacrylate (MMA). Next, MMA and the silica fine particles having polar groups capable of reacting with each other were subjected to liquid dispersion by using a bead mill (UltraApex Mill/manufactured by KOTOBUKI INDUSTRIES CO., LTD.) (not shown).

First, MMA and the silica fine particles whose surfaces had been modified were subjected to a homogenizer in such a manner that coarse aggregated fine particles were crushed, and the resultant was defined as a dispersion stock solution. The dispersion stock solution was charged into a stirring container of the bead mill. Fine particles each having a particle size of 0.03 mm and each made of zirconia were used as fine particles to be stirred by the bead mill machine. The fine particles to be stirred were loaded in such a manner that a ratio of the fine particles to the stirring container would be 60 vol %. The number of revolutions of the bead mill machine was 5,000 rpm, and stirring was performed for 48 hours. The particle size distribution of the fine particles in the dispersion liquid thus obtained was measured with a laser particle size distribution meter. The measurement confirmed that the fine particles were primarily dispersed to have an average particle size of 1 nm. After that, the composite material obtained by using the bead mill was molded into a test piece according to the same mode as that of EXAMPLE 2. The mechanical physical properties and optical physical properties of the test piece thus molded were measured according to the same mode as that of EXAMPLE 1.

The particle size of each of the silica fine particles primarily dispersed in PMMA and a distance between two adjacent particles among the fine particles at this time were observed with a transmission electron microscope (TEM). As a result, a distance between the surfaces of two adjacent particles was about 0.2 nm, and an aggregate of silica fine particles was partially observed. Further, in evaluation for dispersibility by using a TEM image, the fine particles did not satisfy the above-mentioned evaluation criteria, and a large number of aggregates were observed.

In addition, as shown in Table 1, the test piece in this comparative example had an elastic modulus of 1.8 (GPa), a coefficient of thermal expansion of $1.3 \times 10^{-5}$/° C., and a coefficient of water absorption of 0.12%. Therefore, mechanical physical properties each deviating from the additivity range of the composite material could not be exerted.

Comparative Example 3

In this comparative example, a composite material was prepared through an operation similar to that of EXAMPLE 5, but the preparation was performed in such a manner that a ratio of the zirconium oxide particles would be 1 vol %. A measurement sample was produced from the resultant composite material in accordance with the above-mentioned method of producing a measurement sample, and then the sample was evaluated for various properties. Table 1 shows the results.

The sample showed a transmittance and a scattering rate enough for the sample to be used in an optical material. The addition of the fine particles increased an elastic modulus from before the addition, that is, the elastic modulus increased from 3.0 GPa to 6.6 GPa. The addition reduced a coefficient of thermal expansion from before the addition, that is, the coefficient of thermal expansion decreased from 53 ppm to 25 ppm. Further, the addition reduced a coefficient of water absorption from before the addition, that is, the coefficient of water absorption decreased from 1.9% to 0.8%. Although the temperature dependence of a refractive index was alleviated to 0.00010/° C., the addition did not show a large change in refractive index; a refractive index from before the addition was 1.524 while a refractive index after the addition was 1.528. Accordingly, the sample could not show optical properties useful in optical design. It should be noted that, in evaluation for dispersibility by using a TEM image, the sample showed good dispersibility. Therefore, mechanical physical properties each deviating from the additivity range of the composite material could not be exerted.

Comparative Example 4

In this comparative example, a composite material was prepared through an operation similar to that of EXAMPLE 6, but the preparation was performed in such a manner that a ratio of the aluminum oxide particles would be 60 vol %. A measurement sample was produced from the resultant composite material in accordance with the above-mentioned method of producing a measurement sample, and then the sample was evaluated for various properties. Table 1 shows the results.

The sample did not show any transmittance or any scattering rate sufficient for the sample to be used in an optical material. In particular, the scattering rate was large, and in evaluation for dispersibility by using a TEM image, the sample did not satisfy the above-mentioned evaluation criteria, with the result that a large number of aggregates were observed. That is, mechanical physical properties and optical properties each deviating from the additivity range of the composite material could not be obtained.

According to the present invention, a nanocomposite deviating from an additivity range is realized by uniformly dispersing nano-fine particles in a synthetic resin in an optical composite material, which is obtained by dispersing the fine particles in the resin, in a state where an intermolecular force is exerted between two adjacent fine particles. As a result, optical stability such as an elastic modulus, a coefficient of water absorption, a coefficient of thermal expansion, or the temperature dependence of a refractive index is dramatically improved, so the present invention makes it possible to provide an optical element composed of a composite material having a refractive index, the wavelength dispersibility of the refractive index, secondary dispersibility, and a light-scattering rate, which could not have been conventionally realized.

TABLE 1

| Example | Production method | | | Materials | | | | Results of evaluation | |
|---|---|---|---|---|---|---|---|---|---|
| | Dispersion method | Production process | Resin | Fine particle | Surface treatment | Particle size/ nm | Content/ vol % | Distance between surfaces/ nm | Elastic modulus/ GPa |
| Example 1 | Melting and dispersion | Biaxial extrusion | PMMA | Silica | Present | 5 | 5 | 4 | 15 |
| Example 2 | Liquid dispersion | Bead mill | MMA | Silica | Present | 30 | 0.1 | 280 | 7 |
| Example 3 | Liquid dispersion | Bead mill | MMA | Silica | Present | 1 | 10 | 0.4 | 18 |
| Comparative Example 1 | Liquid dispersion | Bead mill | MMA | Silica | Present | 30 | 0.02 | 660 | 3.5 |
| Comparative Example 2 | Liquid dispersion | Bead mill | MMA | Silica | Present | 1 | 15 | 0.2 | 20 |
| Example 4 | Melting and dispersion | Biaxial extrusion | PMMA | $TiO_2$ | Absent | 15 | 20 | 2.5 | 7.1 |
| Example 5 | Liquid dispersion | Bead mill | Photocurable resin | $ZrO_2$ | Present | 7 | 10 | 2.6 | 7.2 |
| Comparative Example 3 | Liquid dispersion | Bead mill | Photocurable resin | $ZrO_2$ | Present | 7 | 1 | 16.7 | 6.6 |
| Example 6 | Liquid dispersion | Bead mill | Thermosetting resin | $Al_2O_3$ | Present | 20 | 50 | 0.5 | 9.2 |
| Comparative Example 4 | Liquid dispersion | Bead mill | Thermosetting resin | $Al_2O_3$ | Present | 20 | 60 | 0.1 | — |
| Example 7 | Liquid dispersion | Microreactor | MMA | Polystyrene | Present | 15 | 5 | 10 | 13 |

| Example | Results of evaluation | | | | | | |
|---|---|---|---|---|---|---|---|
| | Coefficient of thermal expansion/ $10^{-5}$ | Coefficient of water absorption/% | Transmittance/% | Scattering rate/% | Refractive index | Temperature dependence of refractive index/° C. | Dispersibility of particles |
| Example 1 | 1.4 | 0.1 | 89.5 | 0.8 | | | Good |
| Example 2 | 2.3 | 0.15 | 90 | 0.9 | | | Good |
| Example 3 | 1.3 | 0.1 | 88.5 | 0.8 | | | Good |
| Comparative Example 1 | 6.5 | 0.35 | 93.5 | 0.1 | | | Good |
| Comparative Example 2 | 1.3 | 0.1 | 82.5 | 0.9 | | | Bad |
| Example 4 | 2.2 | 0.2 | 85.2 | 0.8 | 1.674 | 0.00009 | Good |
| Example 5 | 2.5 | 0.5 | 87.1 | 0.9 | 1.562 | 0.00008 | Good |
| Comparative Example 3 | 2.5 | 0.8 | 90.3 | ≤0.1 | 1.528 | 0.0001 | Good |
| Example 6 | 4.5 | 0.5 | 80.8 | 0.9 | 1.606 | 0.00006 | Good |
| Comparative Example 4 | — | — | 74.6 | 3.3 | — | — | Bad |
| Example 7 | 1.5 | 0.15 | 83.2 | 0.5 | — | — | Good |

This application claims priority from Japanese Patent Application No. 2005-290072 filed Oct. 3, 2005, Japanese Patent Application No. 2005-290073 filed Oct. 3, 2005 and Japanese Patent Application No. 2006-255442 filed Sep. 21, 2006 which are hereby incorporated by reference herein.

The invention claimed is:

1. An optical synthetic resin comprising:
a synthetic resin; and
fine particles dispersed in the synthetic resin at a ratio of 0.1 vol % or more to 50 vol % or less and each having a maximum length of 1 nm or more to 30 nm or less,
wherein the fine particles comprise a first fine particle and a second fine particle,
wherein a part of a surface of the first fine particle is modified with a first functional group and another part of the surface of the first fine particle is not modified,
wherein a part of a surface of the second fine particle is modified with a second functional group and another part of the surface of the second fine particle is not modified,
wherein the first functional group and the second functional group are bonded with each other, and
wherein a distance between two arbitrary adjacent fine particles among the fine particles is 0.1 nm or more to 500 nm or less,
wherein the first functional group is 3-ferrocenepropanecarboxylic acid and the second functional group is 5-aminovalerianic acid.

2. An optical synthetic resin comprising:
a synthetic resin; and
fine particles dispersed in the synthetic resin at a ratio of 0.1 vol % or more to 50 vol % or less and each having a maximum length of 1 nm or more to 30 nm or less,
wherein the fine particles comprise a first fine particle and a second fine particle,
wherein a part of a surface of the first fine particle is modified with a first functional group and another part of the surface of the first fine particle is not modified,
wherein a part of a surface of the second fine particle is modified with a second functional group and another part of the surface of the second fine particle is not modified,
wherein the first functional group and the second functional group are bonded with each other, and
wherein a distance between two arbitrary adjacent fine particles among the fine particles is 0.1 nm or more to 500 nm or less,
wherein the first functional group is 6-aminohexanoic acid and the second functional group is methyl azelate.

3. An optical synthetic resin comprising:
a synthetic resin; and
fine particles dispersed in the synthetic resin at a ratio of 0.1 vol % or more to 50 vol % or less and each having a maximum length of 1 nm or more to 30 nm or less,
wherein the fine particles comprise a first fine particle and a second fine particle,
wherein a part of a surface of the first fine particle is modified with a first functional group and another part of the surface of the first fine particle is not modified,
wherein a part of a surface of the second fine particle is modified with a second functional group and another part of the surface of the second fine particle is not modified,
wherein the first functional group and the second functional group are bonded with each other, and
wherein a distance between two arbitrary adjacent fine particles among the fine particles is 0.1 nm or more to 500 nm or less,
wherein the first functional group is 16-hydroxyhexadecanoic acid and the second functional group is 3-ferrocenepropanecarboxylic acid.

* * * * *